(12) United States Patent
Dale, Jr.

(10) Patent No.: US 7,089,776 B2
(45) Date of Patent: Aug. 15, 2006

(54) CALIBRATION CERTIFICATION FOR WHEEL ALIGNMENT EQUIPMENT

(75) Inventor: James Dale, Jr., Conway, AR (US)

(73) Assignee: Snap-On Incorporated, Kenosha, WI (US)

( * ) Notice: Subject to any disclaimer, the term of this patent is extended or adjusted under 35 U.S.C. 154(b) by 183 days.

(21) Appl. No.: 10/764,494

(22) Filed: Jan. 27, 2004

(65) Prior Publication Data

US 2004/0244463 A1 Dec. 9, 2004

Related U.S. Application Data

(60) Provisional application No. 60/442,507, filed on Jan. 27, 2003.

(51) Int. Cl.
*G01C 17/38* (2006.01)

(52) U.S. Cl. ............................ 73/1.75; 33/203.18

(58) Field of Classification Search ............... 73/1.75, 73/1.79, 1.81; 33/288, 203, 203.12–203.21; 356/155
See application file for complete search history.

(56) References Cited

U.S. PATENT DOCUMENTS

| | | | |
|---|---|---|---|
| 5,024,001 A | 6/1991 | Borner et al. | |
| 5,046,032 A | 9/1991 | Alusick et al. | |
| 5,535,522 A | 7/1996 | Jackson | |
| 5,598,358 A | 1/1997 | Gender et al. | |
| 5,724,743 A | 3/1998 | Jackson | |
| 5,809,658 A * | 9/1998 | Jackson et al. | 33/288 |
| 5,943,783 A | 8/1999 | Jackson | |
| 6,427,346 B1 * | 8/2002 | Stieff et al. | 33/203 |

FOREIGN PATENT DOCUMENTS

| | | |
|---|---|---|
| EP | 0 593 066 A1 | 4/1994 |
| EP | 0 994 329 A1 | 4/2000 |

OTHER PUBLICATIONS

Hunter Engineering Co. Product Literature—Form No. 4346T, "DSP400 Series Sensors", dated Mar., 2001 (36 pages—See pp. 1, 6 & 18, specifically).

Hunter Engineering Co. Product Literature—Form No. 3493T, "Evaluation of the Performance of Electronic Wheel Alignment Equipment", dated Jul., 1997 (20 pages—See Figs. 14 and 16 Specifically).

Hunter Engineering Co. Product Literature—Form No. 1420T, "Operation and Calibration Instructions—Hunter Electron-A-Line models S7 et al." dated Jun., 1979 (19 pages).

Hunter Engineering Co. Product Literature—Form No. 1415T, "Operation and Calibration Instructions—Hunter Electron-A-Line models S7M & S7S" dated Jun., 1979 (20 pages).

* cited by examiner

*Primary Examiner*—Robert Raevis
(74) *Attorney, Agent, or Firm*—McDermott Will & Emery LLP

(57) ABSTRACT

A disclosed jig, for use in certifying accuracy of a vehicle wheel aligner, includes two axles of equal length having stub shafts at the ends of the axles and two adjustable side spacers for releasable connection to the stub shafts. Plates for mounting heads of the aligner system also are attached to the stub shafts. Stands support the corners of the rectangular jig formed by the connected axles and spacers. The aligner system measures parameters of the jig from the attached heads. A diagonal spacer of a predetermined length, may be used in setting the diagonals of the rectangular jig during assembly to be equal. In the example disclosed, the apparatus also includes a distance setting shaft for use in setting lengths of each of the two side spacers to be equal.

31 Claims, 9 Drawing Sheets

CALIBRATION CERTIFICATION FOR WHEEL ALIGNMENT EQUIPMENT

RELATED APPLICATIONS

This application claims the benefit of U.S. Provisional Application No. 60/442,507 Filed Jan. 27, 2003 entitled "Calibration Certification for Wheel Alignment Equipment," the disclosure of which is entirely incorporated herein by reference.

TECHNICAL FIELD

The present subject matter relates to techniques and equipment for measurement of performance of vehicle wheel alignment equipment, for independent, traceable certification of system accuracy.

BACKGROUND

Accurate alignment of the wheels in an automobile or other vehicle is important for proper handling of the vehicle and proper tire wear. Correct wheel alignment also decreases fuel consumption and improves vehicle safety. Typical wheel alignment systems measure parameters such as camber, caster, steering axis inclination and toe.

There are many different types of devices and systems that have been used to perform one or more of the wheel alignment measurements. Although the sensing scheme used may vary, many modern alignment systems utilize sensor heads or targets mounted to the vehicle wheels, and a computer, to process sensed signals to determine the alignment parameters. In any such system, accurate measurements depend on accurate calibration of the alignment system components. A manufacturer may calibrate the wheel alignment system, as part of the manufacturing and/or installation process, and the system may be re-calibrated from time to time to compensate for wear and tear. A variety of devices and techniques have been used to calibrate the different types of wheel alignment systems.

It is desirable to certify that measurements taken using a calibrated system satisfy industry standards, for example, the relevant standard set by the International Organization for Standardization (ISO). Stated another way, to show that a vehicle has been aligned in accord with a standard requires that alignment of the vehicle wheels has been performed using an alignment system that has been tested and certified for compliance with the standard. To show that an alignment system qualifies under the standard, a need exists to certify or verify that the accuracy of the calibration of the wheel alignment equipment falls within the acceptable levels specified in the relevant standard.

In the past, one approach, particularly as used by vehicle original equipment manufacturers (OEMs), has been to take measurements of system performance using a rolling master that had been qualified in advance to correspond to appropriate national standards. The rolling master was a robust device, approximately the size of a vehicle, and it was qualified using a theodolite system or a laser tracker to have precisely known wheel alignment parameters. The manufacturer's technicians would operate the wheel alignment system that was to be certified, so as to measure wheel plane angles and positions in space on the master. The alignment system would convert the measured parameters to vehicle coordinates and would process those values to derive alignment parameters for the master, such as its toe and camber. Positional information could also be expressed as wheelbase, track width, setbacks, lateral offsets and the like. The various derived values for alignment parameters and/or positional information were then compared to the known values for the qualified rolling master, to determine measurements of the system accuracy with respect to each value determined by the alignment system. If the accuracy of the system under test were within certain limits with regard to acceptable accuracy (e.g. in compliance with the relevant standard), then the manufacturer would certify the accuracy of the system and thus of the alignment of its vehicles performed using that system. Although this approach, using the rolling master was adequate for OEMs or the like, it was not readily adaptable to application in common auto shops. For example, the rolling master was relatively difficult to transport, and it is simply not practical to have such a master at every tire store or auto dealership that does wheel alignments.

Another method used to show good calibration of an aligner with wheel-mounted measurement instruments was to take normal measurements on one or two calibration bars and determine if total toe and camber values were zero. However, this technique did not provide traceability of accuracy, to allow certification. This check of calibration did not use verification means separate from the primary calibration means and did not provide individual toe confirmation.

Hence a need exists for an enhanced technique for providing verification or certification of calibration accuracy of a wheel alignment system, which is readily adaptable to periodic certification of aligners that may be installed in many different shop locations. Hence, any solution should utilize portable or collapsible certification equipment so as to be relatively easy to transport to or store at shop sites. The certification equipment should be easy to assemble and use, and should itself be relatively easy to qualify as to the accuracy of its characteristics.

SUMMARY

The concepts disclosed herein address one or more of the needs noted above with regard to techniques and/or equipment for certifying the calibration of wheel alignment systems.

For example, a new technique encompasses a method of certifying calibration of a vehicle wheel alignment system. This method involves checking length of two side spacers of a certification jig for proper length, and assembling two equal-length axles and the two side spacers, to form the certification jig with a parallelogram shape. At least one diagonal of the certification jig is checked, to insure that the jig is assembled so as to have the desired parallelogram shape. For a rectangular example of the jig, both of the diagonals of the jig may be checked with a spacer, and the jig adjusted, until both diagonals are equal in length. The certification method also involves mounting heads of the wheel alignment system at opposite ends of the axles, and operating the wheel alignment system to take a measurement of a parameter of the certification jig. The measured parameter is compared to a known value of a corresponding parameter of the certification jig; and the alignment system is certified as being accurately calibrated, if the comparison shows that the measured parameter is within a standard acceptable range of the known value of the corresponding parameter of the certification jig.

An apparatus for use in certification of accuracy of a wheel aligner has a frame, and mounts on the frame for supporting heads of the wheel aligner system. The apparatus is easily portable. Also, the frame is configured so that the mounts support the heads at locations approximating wheelbase and track width dimensions of a vehicle which may be measured using the wheel aligner.

An example of such an apparatus for use in certification of accuracy of a vehicle wheel aligner system, for example, in accord with the above-discussed method, includes two axles of equal length having stub shafts. A stub shaft is located along a longitudinal axis of each respective axle, at each end of the respective one of the two axles. The apparatus also includes two side spacers of equal length. Each end of each of the side spacers has an opening for receiving one of the stub shafts, to allow attachment of the two side spacers to the ends of the axles, to thereby assemble a frame from the axles and side spacers. The frame has a parallelogram shape. In a disclosed example, the parallelogram of the frame is a rectangle. Four plates, adapted to facilitate attachment of heads of the vehicle wheel aligner system under test, are attached to the stub shafts at the ends of the axles. The plates simulate the vehicle wheel, allowing the wheel attachment device of the alignment system to be included in the accuracy certification. The apparatus also includes a stand system, to support the jig in a position to allow the vehicle wheel aligner system under test to measure parameters of the apparatus from the attached heads.

The apparatus may also include a diagonal spacer of a predetermined length, for use in setting length of a diagonal of the frame during assembly. In the exemplary certification jig, the length of each of the two side spacers is adjustable. The disclosed example of the apparatus therefore includes a distance setting shaft of a predetermined length, for use in setting the length of each of the two side spacers, before attachment thereof to the axles at the stub shafts.

Additional advantages and novel features of the examples will be set forth in part in the description which follows, and in part will become apparent to those skilled in the art upon examination of the following and the accompanying drawings or may be learned by production or operation of the examples. The advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

The various examples disclosed herein relate to systems and techniques for verifying or certifying the performance accuracy and/or successful calibration of a system for aligning wheels of a vehicle.

Drawing FIGS. 1 to 15 show the certification equipment and aspects of its component parts. The exemplary equipment or apparatus includes a certification fixture or jig as well as a side-spacer distance setting piece and a diagonal spacer for setting the diagonal distance of the certification jig. The jig includes a frame and mounts on the frame for supporting heads of the wheel aligner system. The equipment is easily portable. The frame is configured so that the mounts support the heads at locations approximating wheelbase and track width dimensions of a vehicle which may be measured using the wheel aligner.

The methodology for certifying calibration of a wheel aligner entails positioning measuring heads of the wheel aligner at locations on a precise known shape of the portable, vehicle-sized jig. An alignment measurement of the jig is taken with the wheel aligner. The method then involves comparing the measurement to known geometry of the jig; and determining accuracy of the wheel aligner from the comparison. It is possible to assemble connectable spacers and axles, so as to form the jig with the precise known shape, prior to positioning the measuring heads. Then, after determining the accuracy of the wheel aligner, the jig is disassembled for transport or storage.

Figure 1:
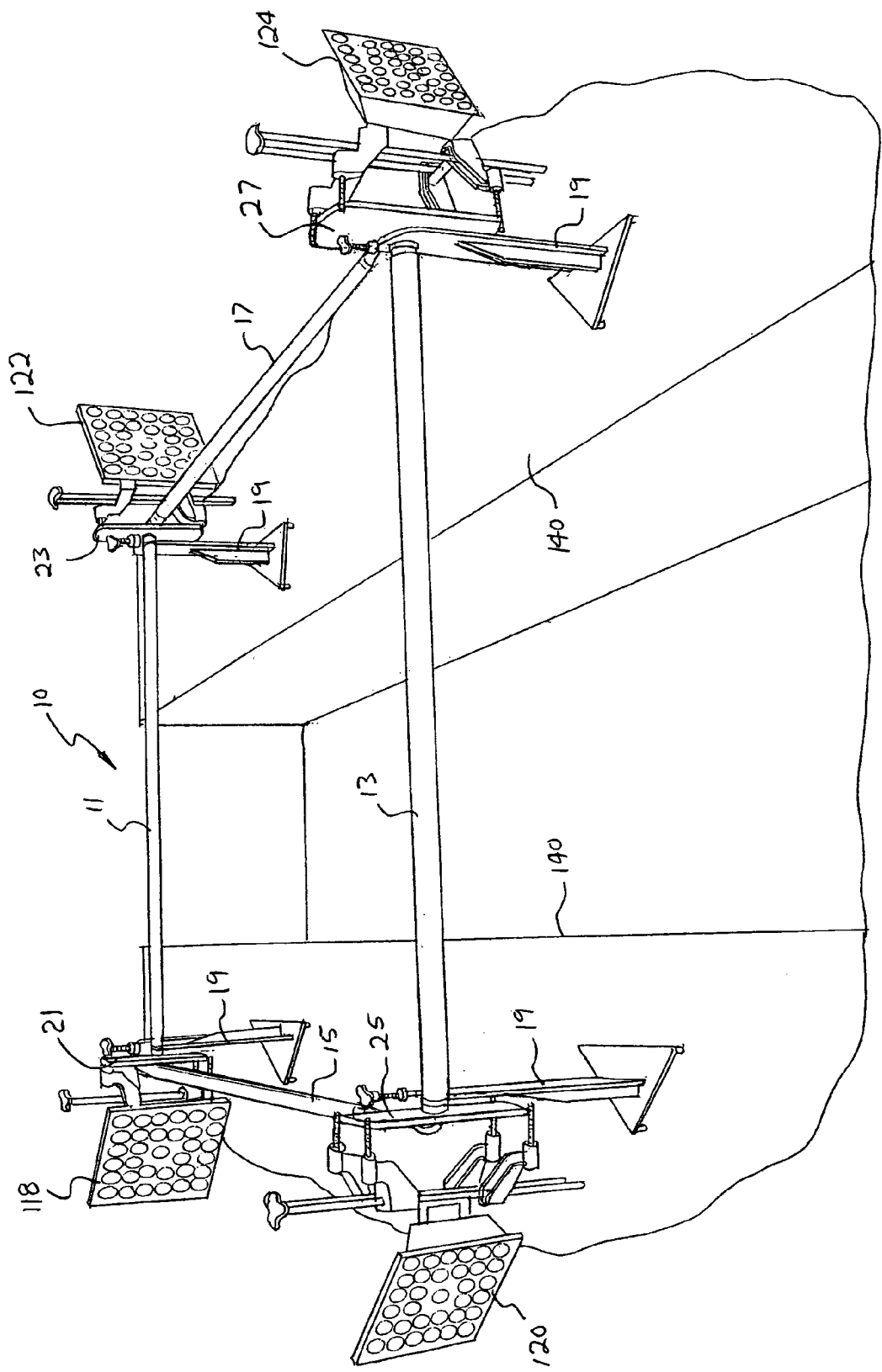
FIG. 1 is a perspective view of an exemplary certification jig or fixture supporting the clamps and target heads of a visual wheel alignment system that is to be certified.

As shown in FIG. 1, the certification equipment includes a certification fixture or jig 10 in position on the ramps of a vehicle rack for performing a calibration routine. The certification jig 10 supports alignment heads, targets or transducers of the particular alignment system, in this case embodied by clamps and optical targets of a visual alignment system, as will be discussed later. The certification jig 10 includes a rigid, precisely dimensioned frame. The frame has a predetermined parallelogram shape. In the example, the jig comprises a rectangular frame formed by two axles 11 and 13 and two side spacers 15 and 17.

The frame is supported in a position to allow the vehicle wheel aligner system under test to measure parameters of the heads mounted on the frame. The support for the frame may use any appropriate structure for supporting sides or corners of the frame, although in the example, the jig 10 uses a system of independent stands. The stands or other support structure may support corners or points on the sides or ends of the frame. In the example, where the frame is rectangular, each of the frame's four corners is supported by one of the stands 19. The axles, spacers and stands may for formed of steel, aluminum or other adequately rigid materials that are not subject to substantial changes in dimension over time, for example due to variations in temperature or humidity.

At its opposite ends, the axle 11 supports two mounting elements, in this example the plates 21 and 23, which are adapted to allow attachments of the appropriate type of clamps. Other mounting elements may be used, for example, to support different types of aligner heads. The axle 13 supports two similar mounting plates 25 and 27. In practice, the elements of the aligner system that normally mount to the vehicle wheels (that is to say the clamps and associated targets in the example) are attached to the plates 21, 23, 25 and 27. For example, each plate may have curved outer sections, as shown at the top and bottom of each plate in the illustrated orientation. Here the curvature facilitates mounting of clamps designed to normally attach targets to the curved rims of wheels. A technician or mechanic operates the aligner system to take measurements, and the results are compared to the known parameters of the certification jig 10.

A processor may provide one or more output parameters, e.g. showing the actual errors or percentage differences of one or more measured values from the known value(s) for the certification jig 10, for example, to help with re-calibration of the aligner system. For certification of adequate performance, the process leads to a pass/fail result, dependent on whether or not the actual results produced by the aligner system under test are within acceptable tolerances of the known values for the certification jig 10, for example, in compliance with a particular standard.

The certification jig 10 is readily assembled and disassembled, and the component parts may be broken down to a size that allows handling by a single technician and transport via a truck or easy local/on-site storage. To maintain accuracy requires that the jig 10 exhibit precisely the same dimensions, each time it is assembled. To help in this regard, in addition to the certification jig itself, the certification equipment includes a diagonal spacer (with an associated stand) and a distance setting piece, as will be described in detail later.

In the example, the stand system consists of four independent stands 19. Each support stand 19 consists of a horizontal base plate and a vertical plate with the "V" notch formed in its upper portion. There are three buttons under the horizontal base plate, which provide a stable mounting on the lift racks 140.

Figure 2:
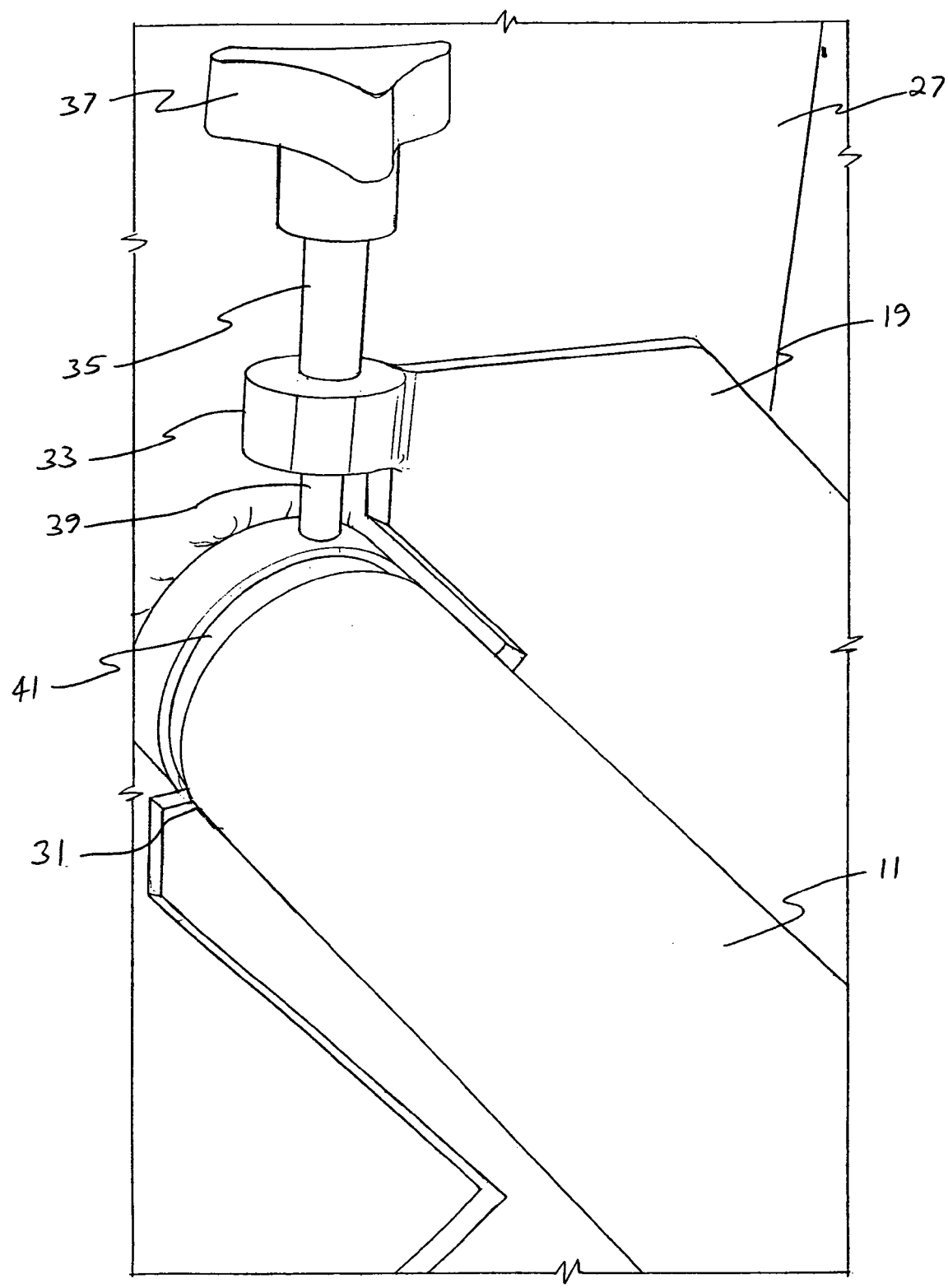
FIG. 2 is a detailed view showing support of an axle of the jig on one of the stands.

FIG. 2 is a close up view showing the mounting of one end of an axle, in this example, the axle 11, in the upper portion of one of the support stands 19. As shown, the upper portion of the stand 19 includes an opening 31 for receiving the axle. The lower portion of the opening 31 is v-shaped, although other shapes may be used. The axle rotates on the lower portion of the opening 31.

A groove 41 in the axle 11 is wide enough and the sides of the groove are tapered (angled outward), to allow the lower portion of the opening 31 to ride within the groove as the axle rotates. In this example, the lower part of the opening 31 is configured to have a "V" notch which allows the groove in the bar to be located both axially and radially. Although not visible in the figure, the "V" notch has edge surfaces which are inclined at 45 degrees to vertical.

The axles 11 and 13 are rotated during the certification process, for the purpose of calculating the wobble, or runout, of the end plates 27. This calculation is a common one which normally is performed during the alignment process to eliminate the effects of a bent wheel or an untrue wheel clamp.

Near the upper end of the opening 31, the stand 19 includes an extension 33, which has a vertical bore formed therethrough. The vertical bore within the extension 33 is threaded to receive the threaded body of a set-screw 35. A thumb-wheel 37 or the like is attached to the upper end of the set-screw 35, to allow a person to turn the set-screw 35 by hand. The lower end 39 of the set-screw 35 is substantially smooth and is tapered to engage the groove 41 formed in the axle. The set-screw 35 may be tightened down, when it is desired to hold the axle in a fixed orientation, however, this is generally not necessary for the certification application, and the set-screw may be eliminated, if desired.

Figure 3:
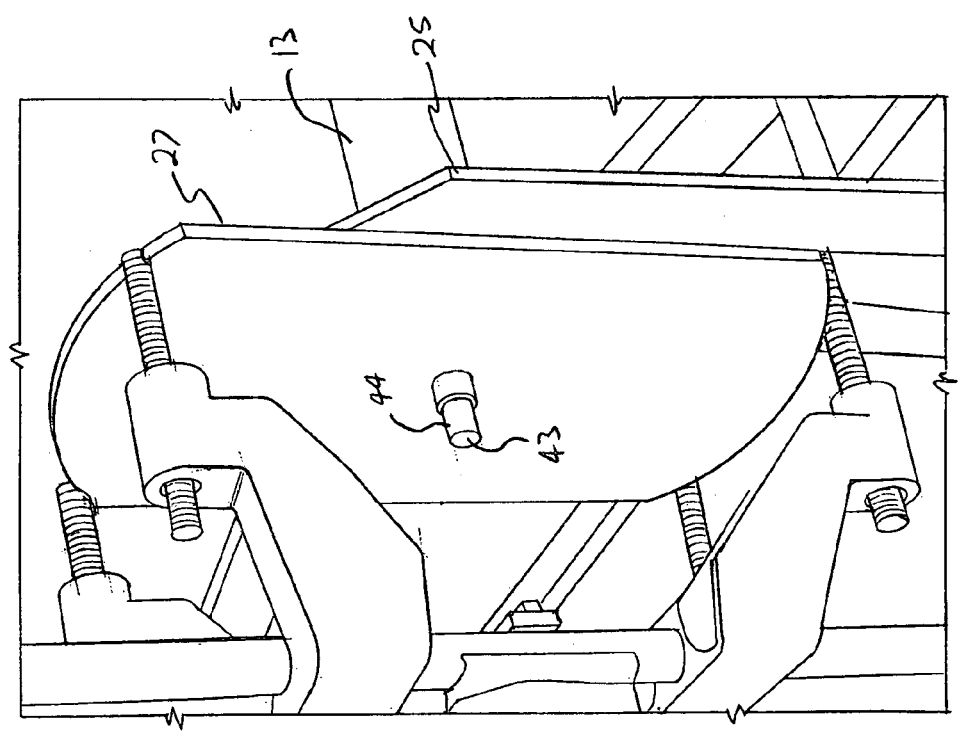
FIG. 3 is a detailed view showing a stub shaft of an axle extending outward from an end plate attached to the axle.

FIG. 3 is an angled view of one end of the axle 13, showing the attached plate 27, which allows mounting the wheel clamps as they would grip a wheel rim. Each end of each axle has a stub shaft. FIG. 3 shows one end of the axle 13, with its stub shaft 43. The plate 25 fits over the stub shaft 43 and is affixed to the axle 13, for example by welding or the like (a portion of such a weld is visible in FIG. 2). The outermost portion of each stub shaft has a reduced diameter portion, represented for example by the portion 44 on the illustrated stub shaft 43. The axle is supported by a stand 19.

Each end of the side spacers 15 and 17 has a spherical rod end attached thereto. On a respective one of the side spacers, the two spherical rod ends are oppositely threaded into the side spacer. Stated another way, one spherical rod end is right-hand threaded, and the other spherical rod end on the particular side-spacer is left-hand threaded. Hence, when rotated relative to the rod ends, the body of the spacer acts as a turnbuckle allowing continuous length adjustment. A lock nut on the threads of each rod end allows relatively permanent setting of the length of each side spacer 15 or 17, so that it may be safely moved and installed as part of the assembly 10.

In the example, the stub shaft and the spherical rod end together serve as detachment and attachment means, for coupling the spacer end to the axle end and for detaching the spacer end form the axle end. As discussed below, the threaded engagement of the rod ends to the shaft of the spacer forms a mechanism enabling adjustment of the effective length of the spacer.

Figure 4:
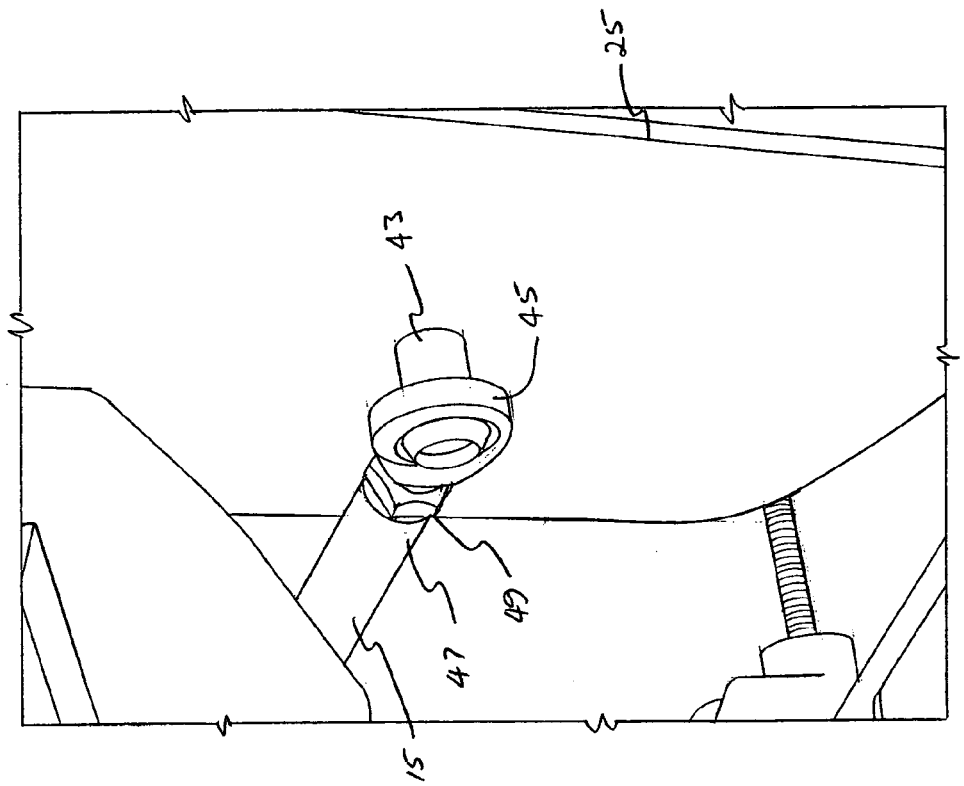
FIG. 4 is an enlarged view of the stub shaft shown FIG. 3, showing the attachment of a spherical rod end on one of the side spacers to the stub shaft.

FIG. 4 is a close up showing the side spacer 15 installed onto the end of one axle 13, specifically, with the side spacer 15 attached to the stub shaft 43 at the location of the center of rotation of the axle 13. This drawing also shows the exemplary elements at the particular end of the side spacer 15. As such, the drawing shows the circular end 45 of spherical rod end fitted over the small diameter portion 44 of the stub shaft 43.

As shown in FIG. 4, the spherical rod end 45 is threaded into a matching threaded shank 47 at the end of the side spacer 15. A lock nut 49 also is screwed onto the threads of the spherical rod end 45. When the threaded portion of the spherical rod end 45 is properly threaded into the threaded shank 47, to achieve the precise length desired, the spherical rod end is locked in position by tightening the lock nut 49 down against the end of the threaded shank 47. Similar elements are used at the opposite end of the spacer 15, except that the threads tighten in the opposite direction. Side spacer 17 (FIG. 1) has similar end components.

Figure 8:
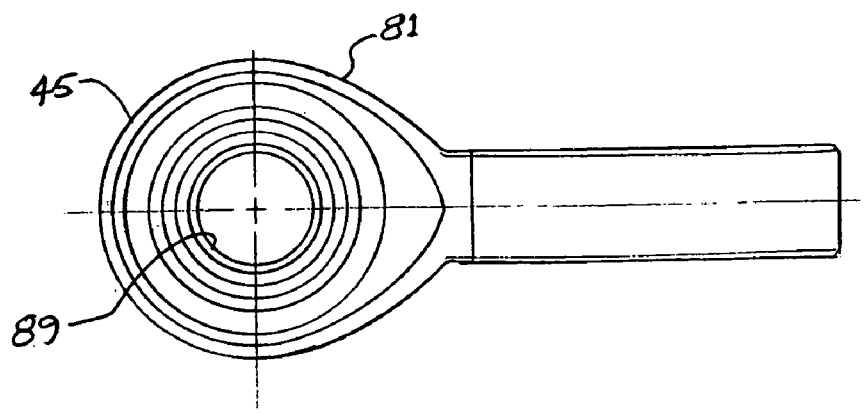
FIG. 8 is a view of one of the spherical rod ends of one of the side spacers.
Figure 9:
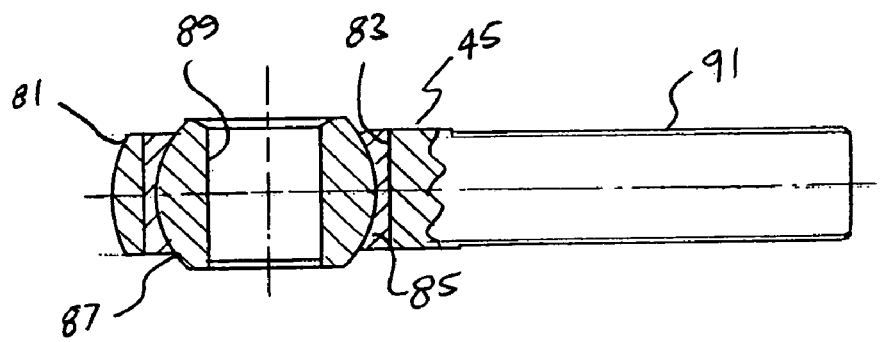
FIG. 9 is a partial cross-sectional view of the spherical rod end of FIG. 8.

The spherical rod end 45 may be a commercial product, such as one of the rod ends available from Aurora Bearing Company of Aurora, Ill. FIG. 8 shows an example of such a spherical rod end 45, and FIG. 9 provides a partial cross-sectional view. As shown in these drawings, the spherical rod end 45 includes a housing having a cylindrical opening or bore 83 for receiving a race 85. The inner surface of the race 85 consists of a segment of a sphere. A partial spherical ball 87 pivots within the race 85. A bore 89 extends through the ball 87. In the jig 10, the bore 89 and the small diameter portion 44 of the stub shaft 43 are dimensioned to provide a snug fit when the bore 89 receives the small diameter portion 44 of the stub shaft 43, that is to say, so that the parts may be fit together and disassembled by hand, but the friction therebetween is sufficient to hold the parts together.

Figure 10:
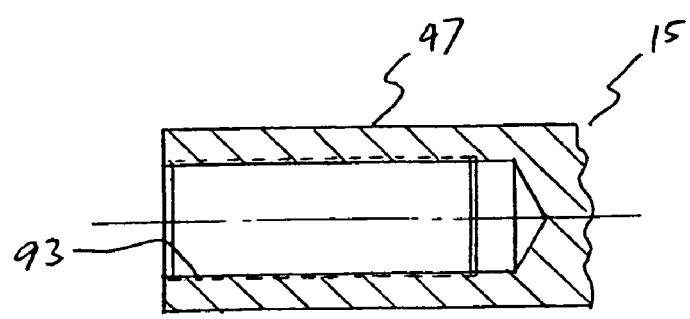
FIG. 10 is a cross-sectional view of a threaded shank on a side spacer, for receiving the threaded portion of one of the spherical rod ends.

FIGS. 8 and 9 also show the threaded shaft 91 of the spherical rod end 45. FIG. 10 is a cross-section view of the shank 47, for example on one end of the side-spacer 15. As shown, the shank has internal threads 93 to receive and mate with the external threads on the threaded shaft 91 of the spherical rod end 45. As discussed above, the threads used for the shank and the spherical rod end on one end of each spacer are right-hand threaded, whereas those on the opposite end of the same spacer are left-hand threaded, to allow turning of the shaft of the spacer to adjust the length of the spacer, like a turn-buckle.

The sphere or ball 87 is free to rotate in the race 85 mounted in the housing 81, and its motion is only constrained by the stub shaft 43 in the through hole 89 interfering with the housing 81. The spherical bearing 45 was selected for the certification jig 10, so that the side spacers 15, 17 could be fit to the axles 11, 13 to achieve parallelism, but without requiring the corners to be square. This flexibility allows practical assembly of the fixture 10 without binding, and also allows a precise fit of all the parts. However, with such flexibility in the corners, it becomes necessary to square-up the corners of the rectangular jig 10 during on-site assembly, as will be discussed later with regard to FIG. 11. Those skilled in the art will recognize that the spherical rod ends may be replaced with other types of coupling devices, for attaching the end of the spacers to the stub shafts or to other features attached to or formed on the ends of the axles. Also, other arrangements of the components of the spacer may be used to facilitate the length adjustment.

Figure 5:
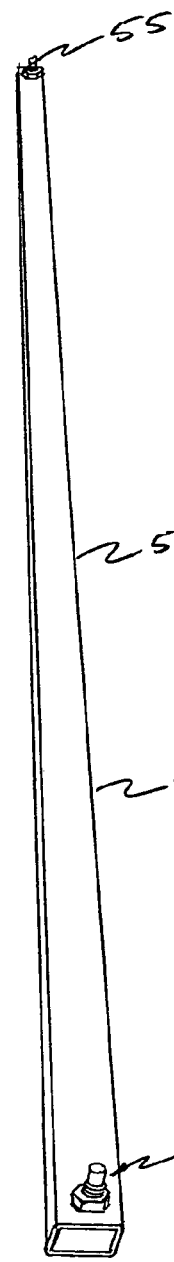
FIG. 5 is a perspective view of the side distance setting piece

As noted above, to maintain accuracy requires that the jig 10 exhibit precisely the same dimensions each time it is assembled. To help in this regard, in addition to the certification jig itself, the equipment includes elements for setting the diagonal spacing and the side distances. FIG. 5 shows an example of the side distance setting piece 51. The side distance setting piece 51 comprises a bar or other piece of a length somewhat greater than that expected for the side spacers 15 and 17. In the example, the element takes the form of a bar formed of a substantially square steel or aluminum box girder 53. Those skilled in the art will recognize that other forms of fixed length elements and/or made of other materials may be used in place of the girder 53.

Figure 6:
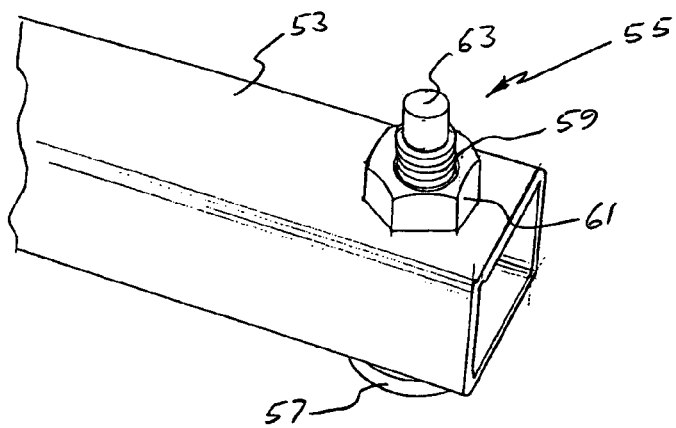
FIG. 6 is a detailed view of one end of the side distance setting piece of FIG. 5.
Figure 7:
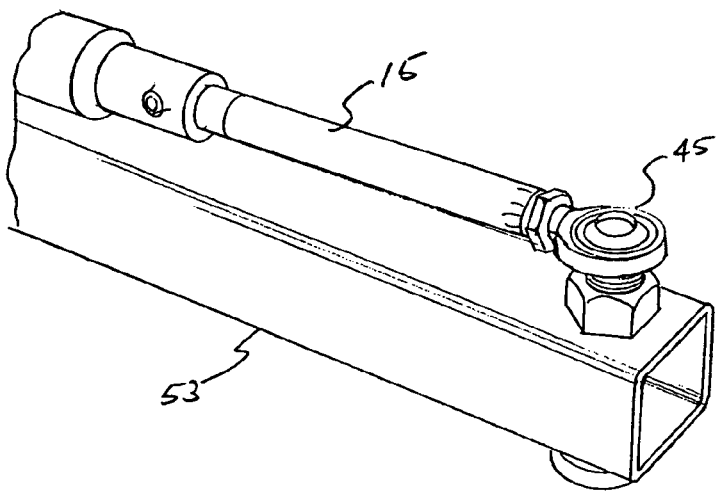
FIG. 7 is a view similar to FIG. 6 but showing the attachment of a spherical rod end on one of the side spacers to the end of the side distance setting piece.

The box girder 53 has holes drilled at opposite ends thereof, to achieve a precise, fixed distance therebetween. A quasi-stub shaft 55 is attached through each hole, to allow attachment of one side spacer 15 or 17 in a manner analogous to the attachment thereof to the stub shafts at the ends of the axles. FIG. 6 provides a close-up view of an end of the girder 53 with one of the quasi-stub shafts 55. The quasi-stub shaft 55 essentially comprises a member extending through the hole in the element 53 and having a stop or carriage 57. The stub shaft 55 includes a threaded portion 59 over which is threaded a lock nut 61. The lock nut 61 is tightened against the surface of the member 53, to hold the quasi-stub shaft 55 in the hole through the girder 53. The distal end of the quasi-stub shaft 55 includes a reduced diameter portion 63, which is similar to the reduced diameter portion 44 of the stub shafts 43. The circular end 45 of one spherical rod end of the side spacer 15 (or 17) fits over the small diameter portion 63 of the quasi-stub shaft 55, as shown in FIG. 7.

The distance setting device 51 essentially acts as a gauge to set and/or confirm the correct, equal length of the side spacers 15 and 17. Both ends of a side spacer 15 or 17 are fitted to the distance setting device 51, in the manner shown in FIG. 7, after the length is adjusted by turning the shaft of the spacer 15 or 17 between the rod ends, thereby acting as a turnbuckle (as discussed above). If the length is not correct, the spacer will not fit onto the distance setting device 51, and the technician will turn the shaft or one or both of the ends as necessary, until the side spacer 15 or 17 fits onto the distance setting device 51. Once the length has been adjusted so that the side spacer 15 or 17 fits with its ends mounted on the distance setting device 51, the lock nuts on the two rod ends are both tightened, to provide a relatively stable, long-term setting of the length of the particular side spacer. The length setting process is repeated, for the other one of the side spacers 15 and 17. The technician may check the length of each spacer 15 and 17 with the distance setting device 51, before each assembly of the jig 10, to insure that the length of the side spacers remains unchanged. In this manner, the use of the distance setting device 51 insures that both side spacers 15 and 17 have the same (equal) length at the times for all aligner certification procedures.

Figure 11:
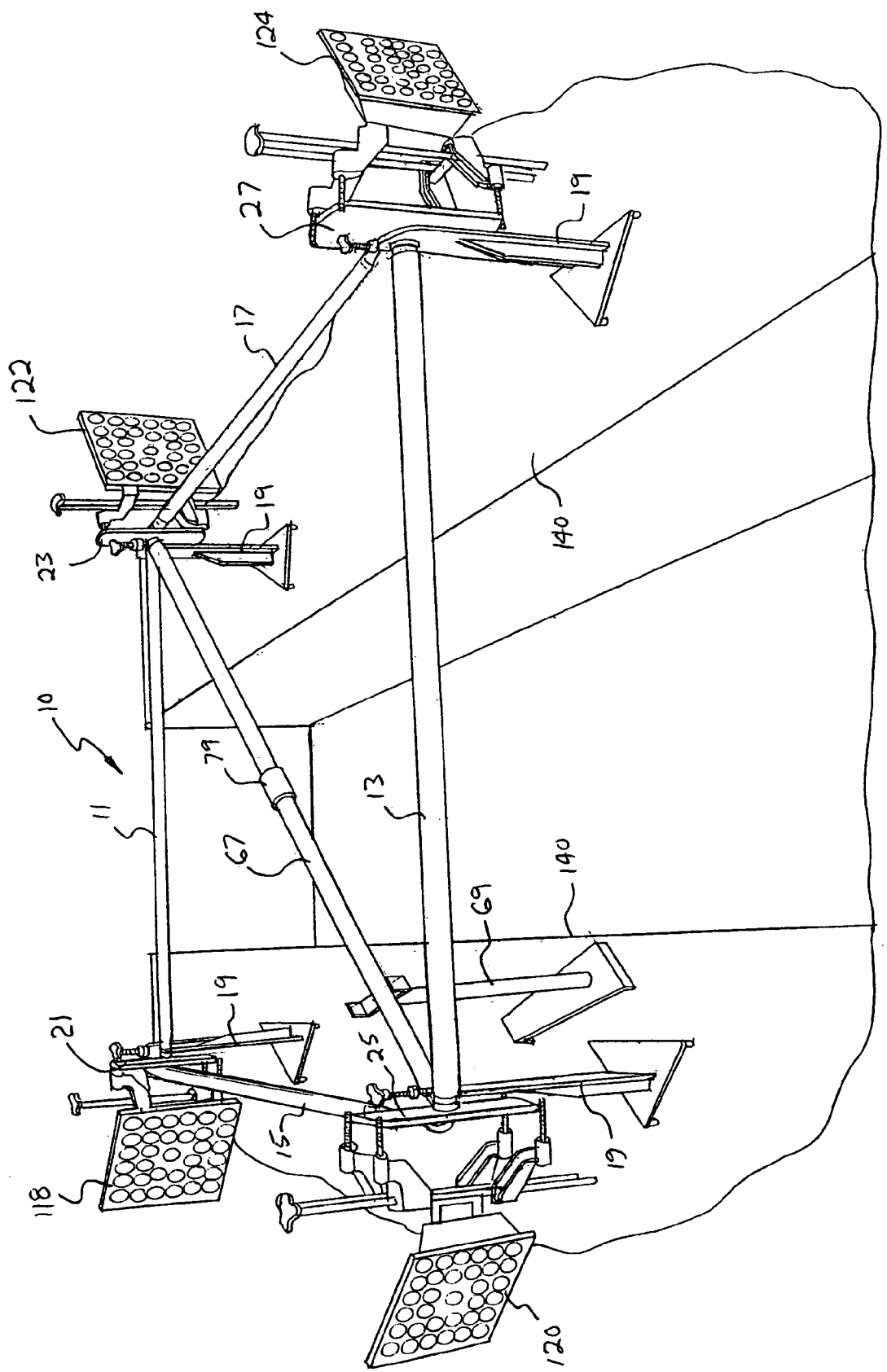
FIG. 11 is a view of the exemplary certification jig or fixture, similar to FIG. 1, but showing the use of the diagonal spacer to measure and adjust one of the diagonals of the jig and thereby true-up the corners.

As noted earlier, due to the desired flexibility in the corners of the jig 10, it is necessary to square-up the corners of the rectangular certification jig 10 during each on-site assembly. For that purpose, the system also includes a diagonal spacer 67 of precisely determined length, corresponding to the desired length of the diagonals of the rectangular jig 10. FIG. 11 shows the diagonal spacer 67 in place, as used to measure one diagonal of the jig 10 and allow movement of the corners thereof to achieve a spacing between corners corresponding to the desired diagonal length as indicated by the diagonal spacer 67. To allow assembly by a single technician, a stand 69 is used to support one end of by the diagonal spacer 67. The technician (not shown) holds the other end in place to confirm when the jig 10 is assembled to have a diagonal of the appropriate length.

Figure 12:
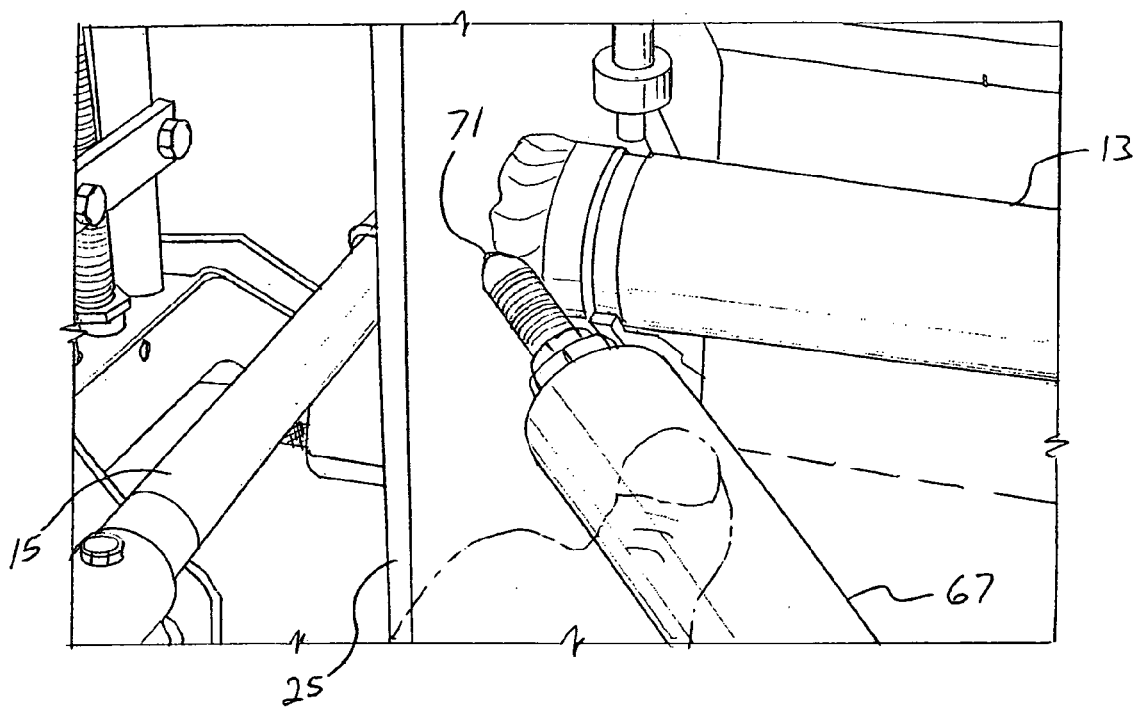
FIG. 12 a detailed view of the adjustable pointed end of the diagonal spacer engaging a corner of the jig shown in FIG. 11.
Figure 13:
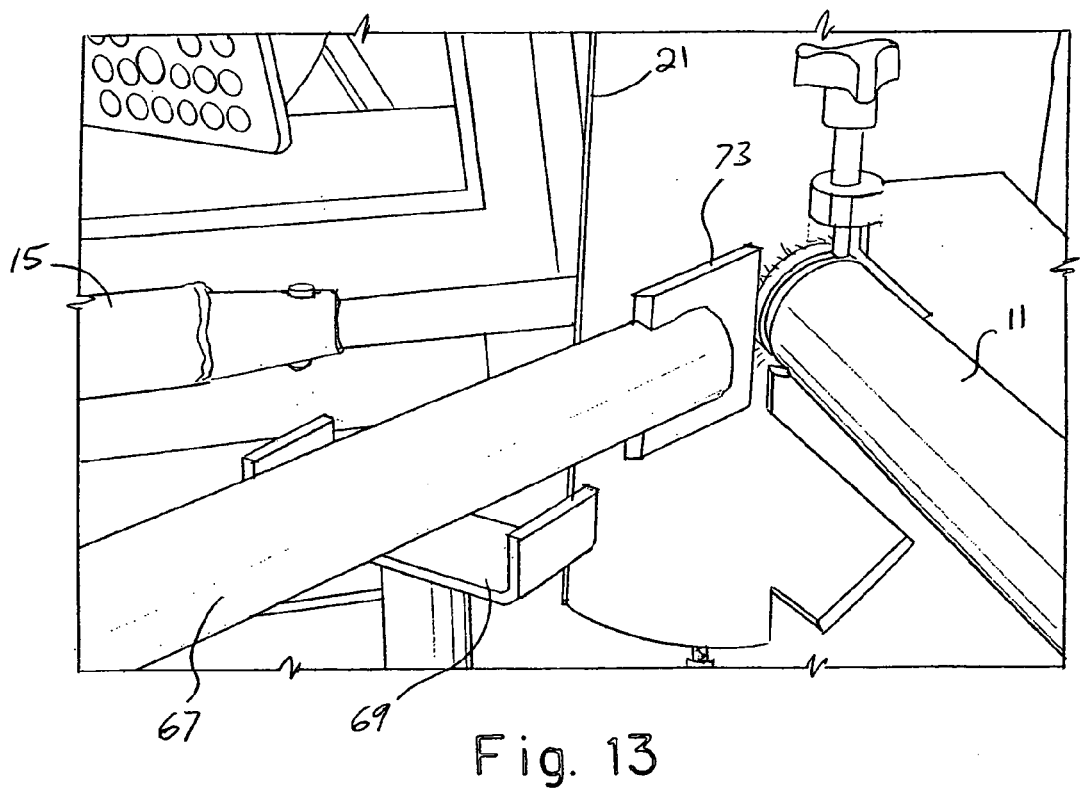
FIG. 13 a detailed view of the knife blade end of the diagonal spacer engaging a corner of the jig shown in FIG. 11.

The diagonal spacer 67 includes a threaded pointed end 71, as shown in FIG. 12. The spacer 67 is positioned such that the pointed end 71 just touches the inside corner of the axle and end plate (axle 13 and end plate 25 in the example), when placed in either diagonal. At its opposite end (FIG. 13), the diagonal spacer 67 includes a "knife end" 73, for example, in the form of a plate welded to the end of the shaft of the diagonal spacer 67 and machined to have the desired knife edge at the distal end of the plate. FIG. 13 shows the knife edge 73 in position inside the axle end plate 21 and the axle 11 (in the opposite diagonal from that represented in FIG. 12). An iterative process is necessary to achieve a rectangle, comprising the steps of: comparing diagonals for equality, determining the shorter diagonal, setting the diagonal gage to the shorter length, moving the diagonal gage to the other diagonal position, adjusting the gap to be half by lengthening the diagonal gage, moving the stands to just fit the diagonal gage, and then repeating the iteration cycle. The iterations are complete when the diagonal gage will just touch the corner in each direction, without moving the fixture as it passes through the minimum clearance point. During each such iteration, the technician supports the diagonal spacer 67 on the stand 69 with the knife edge positioned in one corner as shown for example in FIG. 13, and he holds the pointed end 71 of the spacer 67 in the opposite corner so that the pointed end 71 just touches the inside opposite corner of the axle and end plate (similar to FIG. 12). This set-up procedure achieves the desired rectangular shape, from a previous parallelogram.

Figure 14:
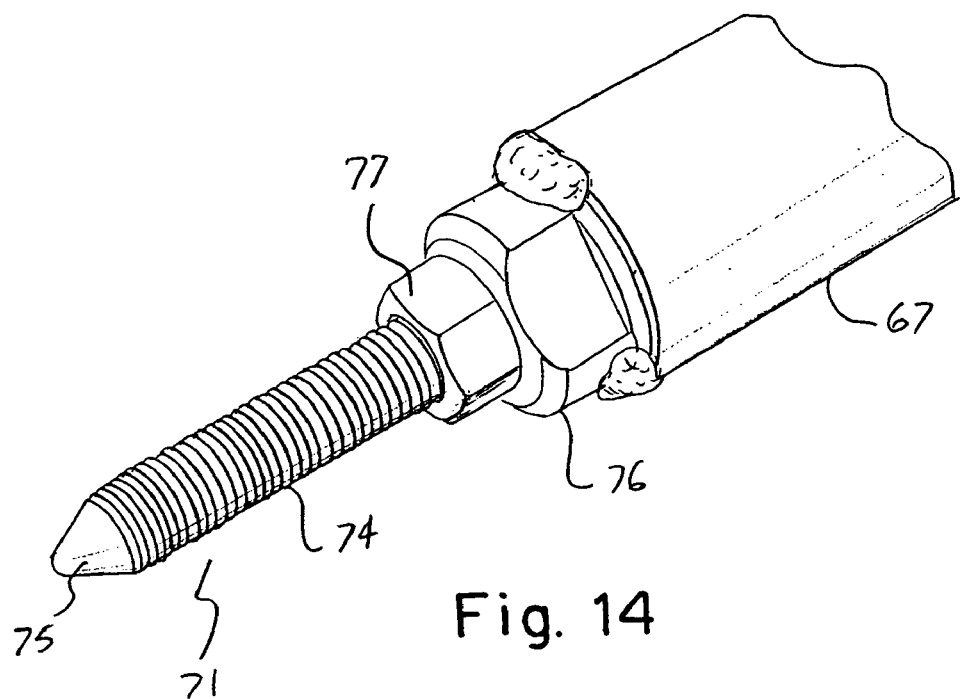
FIG. 14 is an enlarged view of the adjustable pointed end of the diagonal spacer.

FIG. 14 shows the threaded pointed end 71 of the diagonal spacer 67, in somewhat more detail. As shown, the end 71 comprises a threaded shaft 74 having a tapered or conical pointed tip 75. The shaft 74 is threaded into an internally threaded shank 76 attached to the end of the shaft of the diagonal spacer 67. Through the above-described procedure, the shaft 74 is turned and threaded into the shank 76 such a distance that the overall length of the diagonal spacer 67 equals the diagonal length of the jig 10, when the corners are trued-up so that the jig is precisely rectangular. In the example, the threaded shaft 74 is secured in place by a lock-nut 77 turned down to engage the end of the shank 76. Other ends and shaft configurations may be used to form the diagonal spacer. Typically, length of this spacer is adjustable, for example, to facilitate truing-up the rectangular jig by the iterative procedure outlined above.

Figure 15:
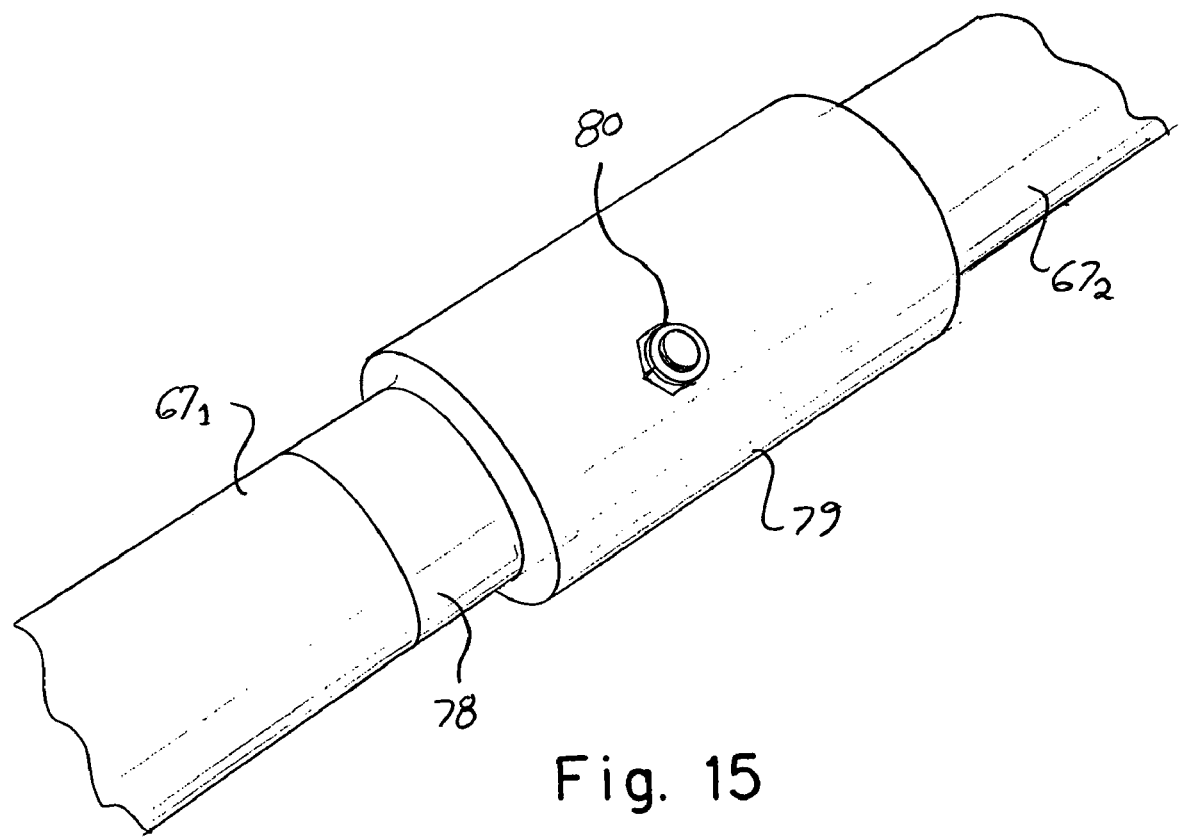
FIG. 15 a detailed view of the detachable coupling used to assemble/disassemble the diagonal spacer.

The diagonal is the longest dimension of any rectangle, and in the system of FIGS. 1 and 11, the diagonal spacer 67 is the longest component. In the example, the diagonal spacer 67 comprises two portions coupled together near the middle, to allow disassembly for easy transport or storage. FIG. 15 shows the joint in the middle of the diagonal spacer 67. Although other releasable couplings may be used, the example uses a slide fit arrangement with a bolt to secure the parts in place at the coupling. Specially, the shaft of diagonal spacer 67 includes two sections 671 and 672. At the middle of the spacer 67, the section 671 has a coupling portion 78 in this case shown as an end of the shaft section machined to provide a slide fit into a coupling member 79 attached to the other section 672 of the shaft. When assembled, a bolt passes through matching bore holes through the coupling portion 78 and the coupling member 79, and a nut 80 is tightened onto the bolt. The nut and bolt 80 hold the coupling portion 78 and the coupling member 79 together, while the diagonal spacer is used for measurement and adjustment of the diagonal(s) of the jig 10.

The certification equipment may be used to verify performance accuracy of a variety of different types of known wheel alignment systems. For purposes of illustration, this application of the certification equipment will provide performance verification for a computer-based image processing type wheel alignment system, sometimes referred to as a "visual" or "3D" aligner. Examples of methods and apparatus useful in 3D alignment of motor vehicles are described in U.S. Pat. No. 5,943,783 entitled "Method and apparatus for determining the alignment of motor vehicle wheels;" U.S. Pat. No. 5,809,658 entitled "Method and apparatus for calibrating cameras used in the alignment of motor vehicle wheels;" U.S. Pat. No. 5,724,743 entitled "Method and apparatus for determining the alignment of motor vehicle wheels;" and U.S. Pat. No. 5,535,522 entitled "Method and apparatus for determining the alignment of motor vehicle wheels." Conventional wheel-mounted instrumented heads could be certified on this apparatus. The basis of their toe measurement is the same as the 3D system described in this specification. The basis for camber measurement of conventional systems is the gravity vector. By adding the step of leveling the axles in a traceable manner, these systems may also be certified. Those individuals skilled in the art will understand the small differences in these applications.

To insure a full appreciation of the operation of the certification equipment, it may be helpful first to consider the structure and operation of an exemplary wheel alignment system, such as a visual aligner. In the example shown in FIG. 16, the aligner system 100 consists of three major components. The first of these elements is an illumination and imaging system 102. This portion of the system comprises two imaging modules 110, 112. Each of the imaging modules 110, 112 includes a light emitter or illumination system (typically a strobe). Each of the imaging modules 110, 112 also includes an image sensor, typically in the form of a digital camera. Essentially, each camera forms an image of objects within its filed of view, which in operation includes one or more targets; and in response to the image each camera generates digital image data.

In an exemplary system 100, each light emitter takes the form of a strobe comprising an array of flashing red LEDs mounted around the aperture of one of the cameras. The system uses high-resolution digital cameras. The imaging modules 110 and 112 are mounted at opposite ends of a horizontal beam 114. The beam provides desired separation between the modules, to allow the desired view of the vehicle wheels from opposite sides. The height of the beam, and thus the height of the cameras in the modules 110 and 112, may be fixed or adjustable. The structure of the beam 114 and the structure for supporting the beam 114 are not significant for purposes of this discussion. Those skilled in the art will recognize that such visual wheel alignment systems may use a single imaging module or use more than the two modules 110, 112 shown in the example.

The second major element of the aligner 3D system 100 is a set of four passive target heads, 118, 120, 122 and 124 for attachment to the vehicle wheels 126, 128 130 and 132, for example, the same as those shown attached to the jig 10 in FIGS. 1 and 11. Each head includes a wheel-rim clamp and an attached target object. In the example, each target object has a planar, light-reflective surface with a plurality of visually perceptible, geometrically configured, retro-reflective target elements, which appear as a pattern of reflective circles or dots of different sizes on the planar surface. Examples of target bodies 134 and target elements 136 acceptable for use in wheel alignment applications are described in U.S. Pat. No. 5,724,743. Other target designs may be used for wheel alignment, for example with different visually perceptible target elements 136; and those skilled in the art will recognize that other aligners utilize different heads.

For wheel alignment, one of the targets 118, 120, 122, 124 is mounted on each of the wheels 126, 128, 130, 132 of the motor vehicle. For the certification of the alignment system, the wheel alignment application, targets 118, 120, 122, 124 are attached to the corner plates 21, 25, 23 and 27, respectively, as shown in the certification example of FIG. 1.

Returning to FIG. 16, each target 118, 120, 120, 124 includes a target body 134, target elements 136, and an attachment apparatus 138. The target elements 136 are positioned on the target body 134. The attachment apparatus 138 attaches the target 118, 120, 120, 124 to wheel 126, 128, 130, 132, respectively (or to the corresponding plate of the jig 10). An example of an attachment apparatus is described in U.S. Pat. No. 5,024,001, entitled "Wheel Alignment Rim Clamp Claw" issued to Bomer et al. on Jun. 18, 1991. Of course other mounting arrangements may be used, e.g. in other aligner systems.

The beam 114 supporting the imaging modules 110 and 112 has a length sufficient to position the cameras in the modules 110, 112 respectively outboard of the sides of the vehicle to be imaged by the visual aligner system 100. Also, the beam 114 positions the cameras in the modules 110, 112 high enough above the shop floor 116 to ensure that the two targets 118, 120 on the left side of the vehicle are both within the field of view of the left side camera in module 110, and the two targets 122, 124 on the right side of the vehicle are both within the field of view of the right side camera in module 112.

The other major element of the aligner system 100 is a programmed computer or host 111, typically a personal computer or similar programmable data processing device. In a typical implementation, the computer 111 includes a processor, a keyboard, a mouse, a printer and a color display monitor. In the wheel alignment application, the computer 111 is programmed to receive and process the image data from the imaging modules 110 and 114. The host computer 111 processes the received data to calculate alignment parameters for a vehicle and to provide a graphical three-dimensional representation of those parameters as a display to a mechanic. In general, the host processing system 111 processes the image information to derive positional data regarding position of the visually perceptible target elements from the camera images; and the host processing system 111 processes the positional data to determine one or more wheel alignment parameters of the vehicle under test. The computer 111 also offers a variety of other information useful in adjusting vehicle alignment, for example, for certification of the accuracy of the system. The computer also provides the user interface for operation of the system.

In operation, once the wheel aligner system 100 has been calibrated in a known manner, a vehicle can be driven onto the rack 140, and, if desired, the vehicle lifted to an appropriate repair elevation. The targets 118, 120, 122, 124, once attached to the wheel rims, are then oriented so that the target elements 136 on the target body 134 face the camera in the respective module 110 or 112. The camera height may be fixed or adjustable to correspond to lift height. The vehicle and model year can then be entered into the computer 111 along with other identifying parameters, such as vehicle VIN number, license number, owner name, etc.

To take measurements, the mechanic begins by operating the system 100 to take a first set of images of the targets 118, 120, 122 and 124. The mechanic then rolls the vehicle back a slight distance, up to eight inches; and the system 100 takes another set of images of the targets 118, 120, 122 and 124. Finally, the mechanic rolls the vehicle forward to its initial position, and the system 100 takes more images. For each of the images, the respective module 110 or 112 provides image data to the host computer 111 for processing. For example, from the position and orientation of the target in the images taken at the various positions, the computer 111 calculates the actual position and orientation of each wheel axis, including certain alignment parameters such as toe, camber, thrust angle and setback.

In the exemplary system 100, one camera is referenced to the other, so that the host computer 111 utilizes a single coordinate system for modeling the vehicle under test. It is not necessary that the supporting rack 140 be level or even that all wheels lie within the same plane. For each vehicle, the computer 111 defines a reference plane that passes through the axles as determined from the two test images taken at different positions of the wheels. Since one of the axles may not lie in the plane defined by the other three, some liberties must be taken. For example, for the purpose of aligning the front wheels 126, 130, the computer 111 defines a reference plane as that formed by the measured axle location of each of the two front wheels and a point midway between the measured axle locations of the rear wheels 128, 132. Front wheel alignment calculations then are referenced to this individually measured plane. A similar technique may be used to reference measurements and adjustments with respect of the rear wheels.

The front wheels 126, 130 of the vehicle may rest on turntables (not shown), so that the mechanic can operate the steering wheel of the vehicle to change the positions of the front wheel during alignment operations. For example, the mechanic will operate the system 100 to take an image of the targets 118, 120, 122 and 124 with the wheels 126, 130 turned to one side. The mechanic then turns the wheels 126, 130 to the other side; and the system 100 takes another image of the targets 118, 120, 122 and 124. From the position and orientation of the front targets 118, 120 in these images taken at the two turned positions, the computer 111 calculates the steering axis about which each front wheel 126 or 130 turns.

Once all measurements are complete, the computer 111 generates a visual output of the measured alignment parameters and/or provides data relating to adjustments needed to bring the alignment parameters back to original manufacturer's specifications. The computer 111 stores manufactured specified values and tolerances for the alignment parameters of many vehicles, and retrieves the appropriate information based on the make and model information input by the mechanic. The mechanic may take corrective action, for example, by making adjustments and/or replacing worn parts, and then repeat the process to confirm that the corrective action resulted in appropriate alignment of the vehicle wheels. If necessary, the mechanic may repeat one or more steps of correcting alignment and re-testing, until all parameters are within acceptable tolerances. When complete, the system 111 can provide visual displays and/or printouts, for purposes of billings, reports to the customer, etc.

Figure 16:
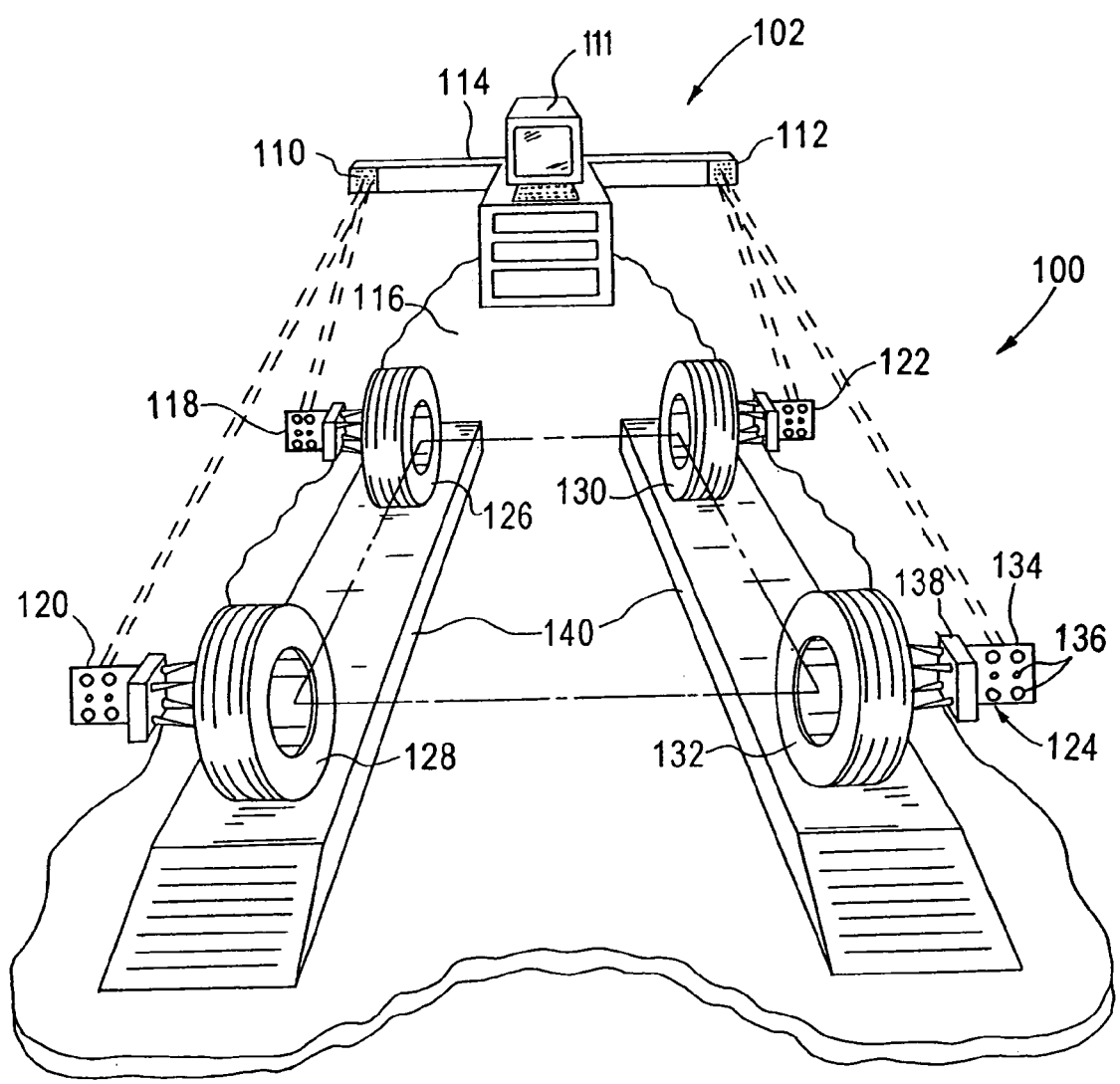
FIG. 16 illustrates operation of an exemplary visual wheel alignment system, which may be tested and certified using the jig or fixture of FIG. 1.

The following is a discussion of an example of a calibration certification process, for a visual wheel alignment apparatus of the type shown in FIG. 16, using the system 10. To insure that calibration is current, the calibration can be checked and certified in approximate one year intervals. With such an approach, if a user checks the time since the last certification, and it is not current (more than a year), the alignment apparatus should be re-certified prior to further use. Alternately, software in the wheel alignment machine may determine if the certification is current.

In a Snap-on Visualigner 3D system 100, the user selects "Maintenance/Calibration Certification" from the PC screen of the aligner computer 111, and follows instructions on the screen of the wheel aligner computer 111.

The certification involves assembly of the jig 10 and positioning the calibration jig at alignment height in front of wheel aligner on racks 140 at alignment height. Essentially, the axles 11 and 13 are placed on the stands 19, the lengths of the side-spacers 15 and 17 are checked with the distance setting piece 51, and the side spacers 15, 17 are attached to the stub shafts on the ends of the axles 11, 13, to assemble the jig 10 approximately as shown in FIG. 1. The clamps and targets are attached to the end plates. The stands and axles may be approximately centered on the racks 140. The technician then measures and adjusts the diagonals of the jig 10 to be equal, using the diagonal spacer 67 (see FIG. 11).

Once the jig 10 is set up and the targets mounted, the instructions on the screen prompt the technician to perform a "rollback" on the stands 19, by rotating the axles and thus the targets while taking measurements with the alignment system 100. The technician can then use the system 100 to obtain readings for toe, camber, and vehicle dimensions from the calibration fixture 10. The measurements are repeated, for example, for a total of ten times. The computer 111 of the aligner processes the ten sets of measurement values to determine calibration, typically by comparing the average values to precise known values for the calibration jig 10. The computer 111 then displays accuracy and pass/fail status. Optionally, a normal calibration may be performed, or offsets may be added/adjusted to re-calibrate the aligner 100, after which the calibration accuracy and pass/fail status is updated to re-test for certification. A certification record may be saved into the computer 111 of the aligner and/or printed for record purposes. The technician performing the certification of the aligner 100 may fill-out a calibration certification form and provide it to the on-site quality control coordinator. Alternatively, these processes may be performed manually or with the aid of an external computational means.

Table 1 below is an example of the data that may be used in such a certification procedure, for example, as a worksheet for certifying a visual aligner system 100.

maximum acceptable values for the parameter, under the appropriate industry standard applicable to the aligner under test. The table may include a column for recording the actual readings (or average of 10 readings) taken during aligner measurements on the configuration jig 10, as well as pass and fail columns to note whether the actual readings fell within the acceptable range of the standard (between the maximum and minimum) for each respective parameter.

A worksheet such as shown in Table 1 may be completed manually by a technician, during the certification process; or the program of the computer 111 may enable the computer 111 to generate a completed table, for display or printout.

After completion of the calibration certification, the certification jig is disassembled and packed in containers, for example, for storage or transport to the next site requiring an aligner certification.

It is also appropriate to check and confirm the calibration of the jig 10, from time to time, e.g. yearly. A process for certifying the parameters of the jig 10 may entail calibrating each of the two side spacers, calibrating each of the four stands, and calibrating the side spacer reference piece and the diagonal spacer. When the jig 10 is assembled, a level vial may be used to check the level of the axles, and the certification of the jig may entail calibration of the level vial. A tape measure may be used to check dimensions of the jig 10 on-site, and if so, the certification of the jig 10 may include calibration of the tape measure. The certification of the jig 10 also includes calibration of the two axles, and the process may include calibration of the stand 69 for the

TABLE 1

Work Instruction to support
Aligner Calibration Certification

| Standard ID | Nominal | Minimum | Maximum | Readings as Received | Pass | Fail |
|---|---|---|---|---|---|---|
| Left Front Toe (deg) | 0.00 | −0.05 | 0.05 | | | |
| Right Front Toe (deg) | 0.00 | −0.05 | 0.05 | | | |
| Left Rear Toe (deg) | 0.00 | −0.05 | 0.05 | | | |
| Right Rear Toe (deg) | 0.00 | −0.05 | 0.05 | | | |
| Left Front Camber (deg) | 0.00 | −0.09 | 0.09 | | | |
| Right Front Camber (deg) | 0.00 | −0.09 | 0.09 | | | |
| Left Rear Camber (deg) | 0.00 | −0.09 | 0.09 | | | |
| Right Rear Camber (deg) | 0.00 | −0.09 | 0.09 | | | |
| Left Wheelbase (mm) | 2035 | 2030 | 2040 | | | |
| Right Wheelbase (mm) | 2035 | 2030 | 2040 | | | |
| Front Track Width (mm) | 1459 | 1454 | 1464 | | | |
| Rear Track Width (mm) | 1459 | 1454 | 1464 | | | |
| LF-RR Diag (mm) | 2503 | 2498 | 2508 | | | |
| RF-LR Diag (mm) | 2503 | 2498 | 2508 | | | |
| Left Front Setback (mm) | 0.0 | −5 | 5 | | | |
| Right Front Setback (mm) | 0.0 | −5 | 5 | | | |
| Left Offset (mm) | 0.0 | −5 | 5 | | | |
| Right Offset (mm) | 0.0 | −5 | 5 | | | |
| Front/Rear Offset (mm) | 0.0 | −5 | 5 | | | |

The table shows the various parameters under consideration (by Standard ID). For each example of such a parameter, the table lists a nominal value that is essentially the known parameter of the certification fixture or jig 10. For each parameter, the table also shows the minimum and diagonal spacer 67. If any items failed the calibration process, the certification may require that they are renewed to their standard specifications, for example by replacement with components that have passed the process. When the procedure is successful, the technician may complete a calibration certificate for the full set of the certification equipment.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to encompass any and all modifications, variations and applications that fall within the true scope of the present concepts.

What is claimed is:

1. A jig for use in certification of accuracy of a vehicle wheel aligner system, comprising:
   two axles of equal length;
   two side spacers of equal length;
   a coupler at each end of each of the two side spacers, allowing attachment of the two side spacers to ends of the two axles, to thereby form a parallelogram frame from the axles and side spacers, and to allow detachment of the two side spacers from the ends of the axles to disassemble the frame;
   a diagonal spacer, for use in setting length of a diagonal of the frame during assembly of the frame, such that the frame becomes rectangular;
   four structures for simulating vehicle wheels, each respective structure being adapted to facilitate attachment thereto of a head of a vehicle wheel aligner system under test, and each respective structure being mounted on one end of one of the axles; and
   a stand system adapted to support the frame in a position to allow the vehicle wheel aligner system under test to measure a parameter of the apparatus from the attached heads of the vehicle wheel aligner system under test, for comparison to a known parameter of the jig.

2. The jig of claim 1, wherein:
   each end of each of the axles comprises a stub shaft;
   each coupler comprises a pivotable member attached at a respective end of one of the spacers having an opening for receiving one of the stub shafts; and
   the means for adjusting the length, on the side spacers, comprises threaded connections of the couplers to the ends of the side spacers.

3. The jig of claim 1, in combination with a distance setting shaft of a predetermined length, for use in setting the length of each of the two side spacers to the predetermined length before attachment thereof to the axles at the stub shafts.

4. The combination of claim 3, wherein the distance setting shaft includes two quasi-stub shafts at the distance setting shaft for inserting into openings of pivotable members of either of one of the side spacers, when the one of the side spacers has the predetermined length.

5. An assembly for use in certification of accuracy of a vehicle wheel aligner system, comprising:
   a jig comprising:
   a) two axles of equal length;
   b) two side spacers of equal length;
   c) a pivotable coupler at each end of each of the two side spacers, allowing attachment of the two side spacers to thereby form a frame from the axles and side spacers, and to allow detachment of the two side spacers from the ends of the axles to disassemble the frame;
   d) four structures for simulating vehicle wheels, each respective structure being adapted to facilitate attachment thereto of a head of a vehicle wheel aligner system under test, and each respective structure being mounted on one end of one of the axles; and
   e) a stand system adapted to support the frame in a position to allow the vehicle wheel aligner system under test to measure a parameter of the apparatus from the attached heads of the vehicle wheel aligner system under test, for comparison to a known parameter of the jig.

6. The assembly of claim 5, wherein:
   the side spacers are adjustable in length; and
   the assembly further comprises at least one setting bar, for setting a predetermined configuration of the jig during assembly.

7. The assembly of claim 6, wherein the at least one setting bar comprises a diagonal spacer, for use in setting lengths of diagonals of the frame to be equal during assembly.

8. The assembly of claim 7, wherein the diagonal spacer comprises two sections and a detachable coupling for connecting the two sections together.

9. The assembly of claim 7, wherein the diagonal spacer comprises means for adjusting the length of the diagonal spacer.

10. The assembly of claim 7, wherein the at least one setting bar further comprises a distance setting shaft for use in confirming that the length of each of the two side spacers is adjusted to a predetermined equal length before attachment to the axles at the stub shafts.

11. The assembly of claim 6, wherein the at least one setting bar comprises a distance setting shaft of a set length, for use in confirming that the length of each of the two side spacers is adjusted to a predetermined equal length before attachment to the axles at the stub shafts.

12. The assembly of claim 11, wherein the distance setting shaft comprises:
   means for attaching ends of the distance setting shaft to the couplers of either of the side spacers; and
   means for adjusting and setting length of the distance setting shaft to define the predetermined equal length for the side spacers.

13. A method of certifying calibration of a computer-based vehicle wheel alignment system, comprising:
   assembling two axles and two side spacers into a quadrilateral shape of a certification jig on the site of the computer-based vehicle wheel alignment system;
   setting at least one diagonal of the certification jig, to insure that the jig is assembled so as to form the quadrilateral shape;
   operating the wheel alignment system to measure a parameter of the certification jig;
   comparing the measured parameter to a known value of a corresponding parameter of the certification jig;
   if the result of the comparison shows that the measured parameter is within a standard acceptable range of the known value of the corresponding parameter of the certification jig, certifying the computer-based vehicle wheel alignment system as accurately calibrated; and
   disassembling the quadrilateral shaped certification jig after the certification of the computer-based vehicle wheel alignment system.

14. The method of claim 13, wherein the wheel alignment system is an image processing type aligner.

15. The method of claim 13, wherein the step of comparing comprises:
   acquiring certification measurement data, and performing calculations on the acquired data, with the wheel alignment system; and the step of certifying comprises producing certification results for said wheel alignment system.

16. The method of claim 13, wherein the ends of the axles include structures for simulating vehicle wheels.

17. The method of claim 16, further comprising mounting heads of the wheel alignment system on the structures, to facilitate the operating of the wheel alignment system to measure the parameter of the certification jig.

18. The method of claim 13, wherein a computer of the computer-based vehicle wheel alignment system controls:
the operating of the wheel alignment system to measure the parameter of the certification jig;
the comparing of the measured parameter to the known value of the corresponding parameter of the certification jig; and
the certifying of the computer-based vehicle wheel alignment system as accurately calibrated.

19. The method of claim 13, wherein:
when assembled into the quadrilateral shape, the certification jig is substantially the size of a vehicle as might be processed by the computer-based vehicle wheel alignment system; and
when disassembled, the certification jig is portable.

20. A method of calibrating a computer-based vehicle wheel alignment system, comprising:
assembling two axles and two side spacers into a predetermined quadrilateral shape of a jig on the site of the computer-based vehicle wheel alignment system;
setting at least one diagonal of the jig, to insure that the jig is assembled so as to form a predetermined geometry;
operating the wheel alignment system to measure a parameter of the jig;
comparing the measured parameter to a known value of a corresponding parameter of the jig;
if the result of the comparison shows that the measured parameter is not in agreement with the known value of the corresponding parameter of the jig, offsetting displayed readings produced by the computer-based vehicle wheel alignment system, by the difference in the measured parameter to the known value of the corresponding parameter of the jig, by means of a calibration offset table; and
disassembling the quadrilateral shaped jig after the calibration of the computer-based vehicle wheel alignment system by the offsetting for displayed readings.

21. The method of 20, wherein the ends of the axles include structures for simulating vehicle wheels.

22. The method of 20, further comprising mounting heads of the wheel alignment system on the structures, to facilitate the operating of the wheel alignment system to measure the parameter of the jig.

23. The method of 20, wherein a computer of the computer-based vehicle wheel alignment system controls:
the operating of the wheel alignment system to measure the parameter of the jig;
the comparing of the measured parameter to the known value of the corresponding parameter of the jig; and
the offsetting of the display readings of the computer-based vehicle wheel alignment system.

24. The method of claim 20, wherein:
when assembled into the quadrilateral shape, the jig is substantially the size of a vehicle as might be processed by the computer-based vehicle wheel alignment system; and
when disassembled, the jig is portable.

25. An apparatus for use in certification of accuracy of a vehicle wheel aligner system, comprising:
two axles, two side spacers and a diagonal spacer;
four couplers for allowing attachment of the two side spacers to ends of the two axles, to thereby form a quadrilateral shaped frame having a diagonal length corresponding to length of the diagonal spacer, and to allow detachment of the two side spacers from the ends of the axles to disassemble the frame, wherein:
when assembled, the quadrilateral shaped frame is substantially the size of a vehicle as might be processed by a vehicle wheel aligner system to be certified,
each of the ends of the axles is configured to enable measurement by the vehicle wheel aligner system to be certified,
each time it is assembled, the quadrilateral shaped frame has the same dimensions, and
the apparatus is portable when the quadrilateral shaped frame is disassembled.

26. The apparatus of claim 25, further comprising a plurality of stands adapted to support the assembled frame in a position to allow the vehicle wheel aligner system to measure a parameter of the assembled frame from the attached heads, for comparison to a known parameter of the apparatus.

27. The apparatus of claim 25, further comprising structures for simulating vehicle wheels at the ends of the axles to provide a configuration for measurement by the wheel aligner system to be certified.

28. The apparatus of claim 27, wherein the structures are means attached at the ends of the axles to provide a configuration for attachment of a head of the vehicle wheel aligner system to be certified.

29. The apparatus of claim 28, wherein said means comprise four head attachment plates, each plate being mounted at one of the ends of the axles.

30. The apparatus of claim 25, wherein:
each end of each of the axles comprises a stub shaft; and
each coupler comprises a pivotable member attached at a respective end of one of the spacers having an opening for receiving one of the stub shafts.

31. The apparatus of claim 25, wherein:
the axles are equal in length;
the side spacers are adjustable in length; and
the apparatus further comprises a distance setting shaft of a predetermined length, for use in setting the length of each of the two side spacers to the predetermined length.

* * * * *